Dec. 3, 1929.  W. F. GROENE  1,737,881
CHANGE GEAR MECHANISM
Filed Jan. 12, 1922   3 Sheets-Sheet 1
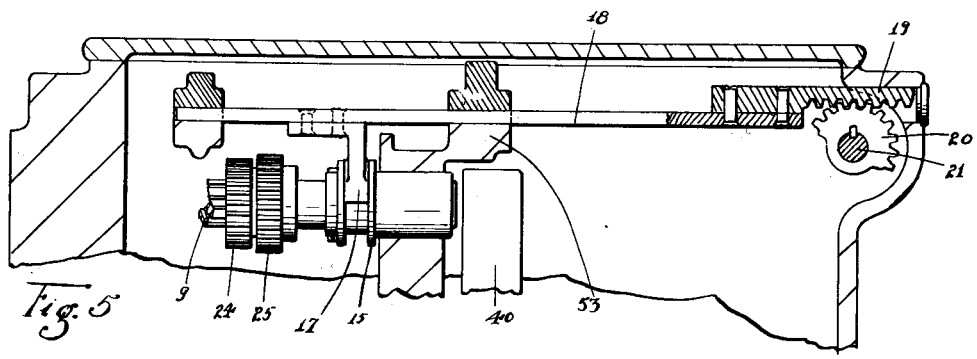
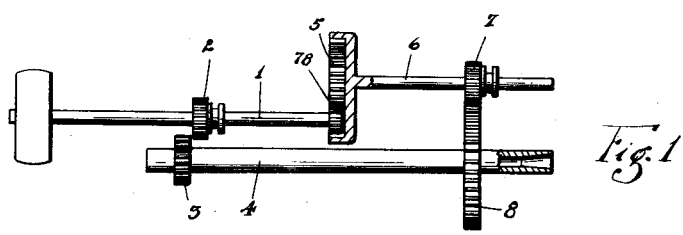

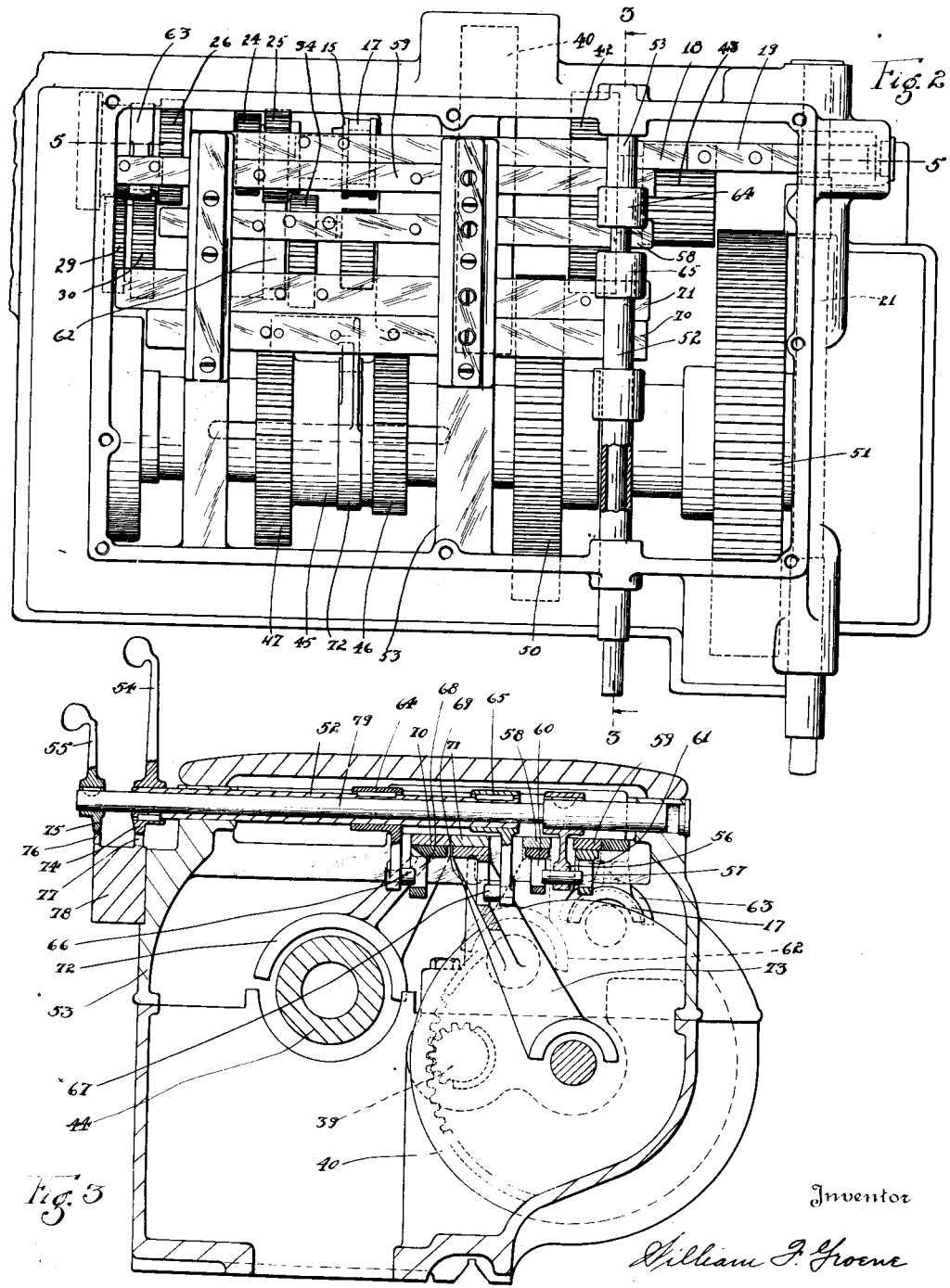

Dec. 3, 1929.  W. F. GROENE  1,737,881
CHANGE GEAR MECHANISM
Filed Jan. 12, 1922  3 Sheets-Sheet 3

Inventor
William F. Groene
By Walter F. Murray
Attorney

Patented Dec. 3, 1929

1,737,881

UNITED STATES PATENT OFFICE

WILLIAM F. GROENE, OF CINCINNATI, OHIO, ASSIGNOR, BY MESNE ASSIGNMENTS, TO THE R. K. LE BLOND MACHINE TOOL COMPANY, OF CINCINNATI, OHIO, A CORPORATION OF DELAWARE

CHANGE-GEAR MECHANISM

Application filed January 12, 1922. Serial No. 528,603.

An object of my invention is to provide a simple drive or transmission mechanism, especially adaptable to machine tools such as lathes, etc.

Another object is to provide a mechanism of this type whereby a maximum of speeds may be attained within a minimum of space.

Another object is to simplify the back gear drive system.

These and other objects are obtained by the means described herein and disclosed in the accompanying drawings, in which:—

Fig. 1 is a diagrammatical view, parts being in section, showing a change gear mechanism embodying my invention.

Fig. 2, is a plan view of a transmission system applied to a lathe and embodying my invention.

Fig. 3, is a sectional view on line 3—3 of Fig. 2.

Fig. 5, is a sectional view on line 5—5 of Fig. 2.

Figure 4:
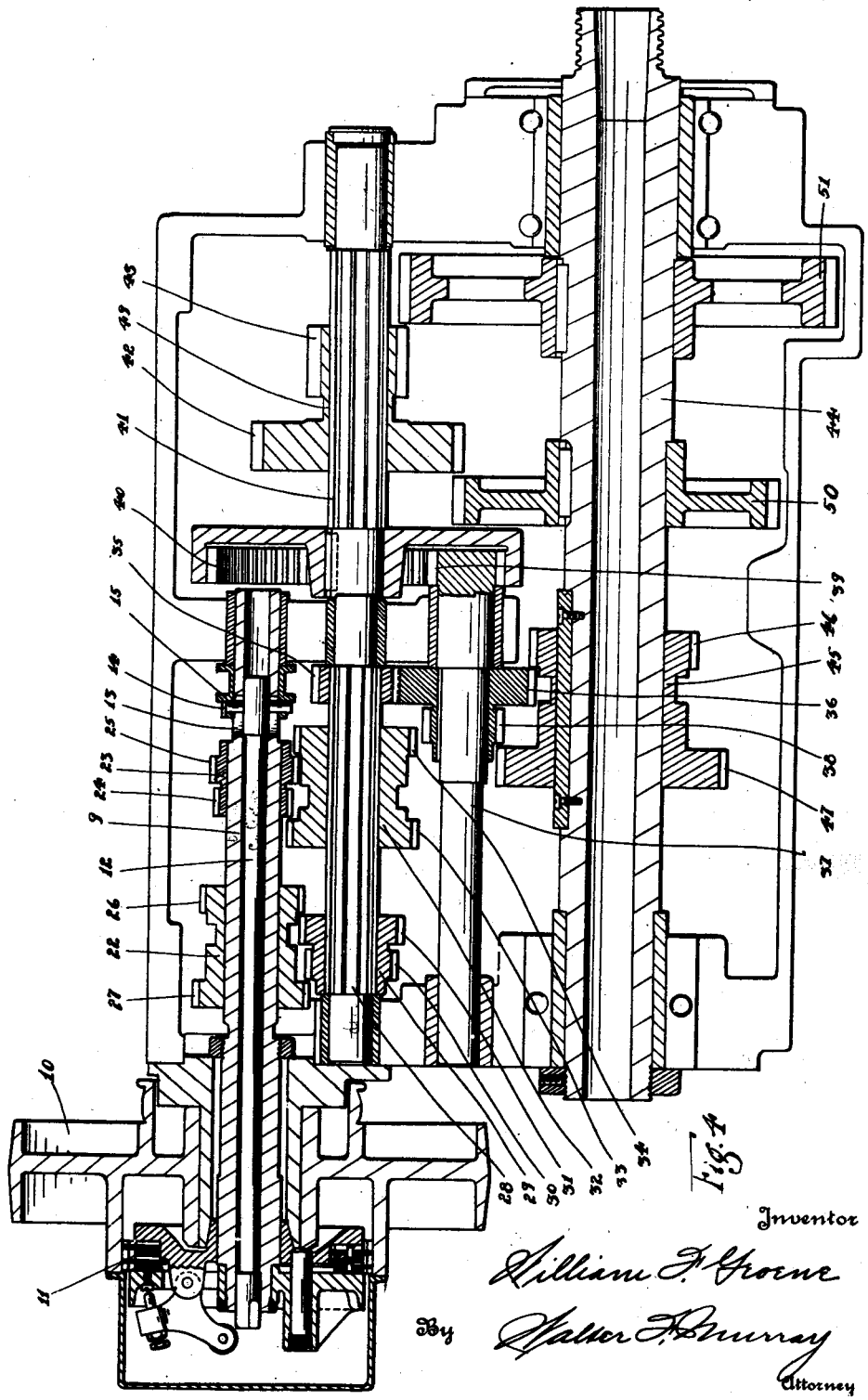
Fig. 4, is a view wherein the several parallel shafts forming details of my invention, are brought into the same plane.

The simplest adaptation of my invention comprises a shaft 1, carrying a gear 2, which may engage a gear 3, mounted on a shaft 4, parallel to shaft 1. The shaft 1, carries a gear 78, which is in constant driving relation with the internal gear 5, mounted on the shaft 6. The shaft 6, has mounted on it a gear 7, which may be employed to drive the gear 8, mounted on the shaft 4. The gears 5 and 7, together with the shaft 6, perform the function of the ordinary back gear drive.

The invention as disclosed in Fig. 1, is embraced within the disclosures in the other views, together with certain additional features.

Referring to Fig. 4, shaft 9, is a drive shaft which may be actuated by a pulley 10, by means of a clutch 11. The clutch 11, may be of any desired type and may be actuated by means of a shaft 12, disposed within the axial bore in the drive shaft 9, in any of the manners well known in the art, for example, as shown in my co-pending application Serial No. 387,748. The shaft 12, is capable of longitudinal reciprocation within the drive shaft 9. The drive shaft has formed in it slots 13, through which a pin 14, carried by the shaft 12, extends. The pin 14, is connected with a spool 15, which spool is engaged by a fork 17 (see Fig. 5). The fork 17 is carried by a reciprocating bar 18, carrying a rack 19, which engages a gear segment 20, carried by a shaft 21 which may be reciprocally actuated by any suitable means The mechanism which has just been described is employed solely to control, the transmission of motion from the pulley 10 to the drive shaft 9. The drive shaft 9, carries sleeves 22 and 23, the sleeve 23 being fixed upon the drive shaft and carrying gears 24 and 25, and the sleeve 22 being slidably mounted upon the drive shaft and carrying gears 26 and 27. The idler shaft 28, carries a sleeve 29, said sleeve being fixed upon the idler shaft and carrying gears 30 and 31, which may engage gears 27 and 26 respectively. The idler shaft also carries a sleeve 32, upon which are mounted gears 33 and 34. The sleeve 32 is slidably mounted on the idler shaft, and the gears 33 and 34 may engage the gears 24 and 25, respectively, on the sleeve 23. The idler shaft has mounted on it a pinion 35, which engages a gear 36, fixedly mounted on the follow shaft 37. The gear 36, is adapted to transmit motion to the gear 38, which may be formed integral with the gear 36. The follow shaft carries a pinion 39, which engages the internal gear 40, mounted on the supplemental shaft 41. The supplemental shaft 41, has slidably mounted on it a sleeve 49, carrying gears 42 and 43. The lathe spindle 44, has mounted on it a sleeve 45, carrying gears 46 and 47, which engage gears 36 and 38, respectively. The sleeve 45, is slidably mounted on the spindle. Gears 50 and 51, are fixedly mounted on the spindle 44, and may engage gears 42 and 43 respectively.

The several sliding sleeves are actuated in the following manner:—A tube shaft 52, functioning as a lever, is revolubly and reciprocally mounted upon the frame 53, of the lathe, transversely to such frame. A slide shaft 79, functioning as a lever, is revolubly and reciprocally mounted within the tube shaft and extends from the end thereof. The tube shaft and slide shaft have suitable levers or handles, 54 and 55, mounted upon their forward ends, whereby they may be revolubly and reciprocally actuated. A bracket 56, is carried by the rear end of the slide rod 79, and carries a pin 57, the ends of which extend from opposite sides of the bracket. The bracket 56, extends between the slide bars 58 and 59, said slide bars being slidably mounted upon the frame 53, and extending in substantial parallelism with the several shafts carrying the gears. The ends of the bars 58 and 59, adjacent the brackets 56, have slots 60 and 61 respectively, formed in them and into which slots the ends of the pin 57 may enter. The pin is of such length and the bars are spaced at such distances, that the pin may assume a position partly within both slots 60 and 61, and may be moved longitudinally of itself so as to engage in but one of said slots. The other or unslotted ends of the bars 58 and 59, carry forks 62 and 63, respectively, said forks engaging sleeves 32 and 22, respectively. The tube shaft 52, carries brackets 64 and 65, carrying pins 66 and 67, respectively, which pins may enter into slots 68 and 69, formed in the slide bars 70 and 71, respectively. The slide bars 70 and 71, are mounted on the frame, in substantial parallelism with the slide bars 58 and 59. The brackets 64 and 65, and the pins carried thereby, bear such relation to the slide bars 70 and 71 that the pins may enter the slots of both slide bars at the same time or one pin enters one slide bar while the other pin lies without the other slide bar. The slide bar 70, carries a fork 72, which engages the sleeve 45, and the slide bar 71, carries a fork 73, which engages the sleeve 49. The handles 54 and 55, may have lugs 74 and 75, respectively, formed upon them, which lugs may lodge between adjacent teeth 76 and 77, formed on the block 78, fixed to the frame 53, thereby retaining the parts in their shifted positions.

The operation of my device is as follows:—

Motion is transmitted from the pulley to the drive shaft through the clutch 11, as explained heretofore. If it is desired to transmit motion from the gears mounted on the sleeve 22, to either of the fixed gears mounted on the idler shaft 28, the handle 55, is pushed rearwardly, thereby causing the forward end of the pin 57 to lie without the slot 60 in the slide bar 58. The handle 55, is then revolubly actuated either clockwise or counter-clockwise, so as to bring the gear 27 into engagement with the gear 30. If it is desired to transmit motion from the fixed gears on the drive shaft through the slidable gears on the idler shaft, the slide shaft 53, is pulled forward instead of being pushed rearward, whereupon the rear end of the pin 57, will clear the slide bar 59, and when the slide shaft 79, is revolubly actuated, the sleeve 32 is slid upon the idler shaft, such movement of the sleeve being determined by the direction of the rotatory motion imparted to the handle 55. In like manner the reciprocation and rotation of handle 54, is employed to actuate the sleeves 45 and 49. This arrangement eliminates any possibility of stripping the gears, as only one gear on any one shaft can engage a gear on the shaft driven by the first mentioned shaft.

What I claim is:

1. In a change gear mechanism the combination of a drive shaft, gears fixedly mounted on the drive shaft, gears splined on the drive shaft, an idler shaft, gears fixed on the idler shaft adapted to engage the gears splined on the drive shaft, gears splined on the idler shaft adapted to engage the fixed gears on the drive shaft, a spindle extending in substantial parallelism with the drive and idler shafts, gears fixed on the spindle, gears splined on the spindle, a supplementary shaft, gears splined on the supplemental shaft adapted to engage the gears fixed upon the spindle, an internal gear upon the supplemental shaft, gears and a pinion actuated by the idler shaft, the pinion engaging the internal gear and the gears being adapted to engage the gears splined upon the spindle, and means to selectively actuate the splined gears.

2. In a change gear mechanism the combination of a drive shaft, gears fixedly mounted on the drive shaft, gears splined on the drive shaft, an idler shaft, gears fixed on the idler shaft adapted to engage the gears splined on the drive shaft, gears splined on the idler shaft adapted to engage the fixed gears on the drive shaft, a spindle extending in substantial parallelism with the drive and idler shafts, gears fixed on the spindle, gears splined on the spindle, a supplementary shaft, gears splined on the supplemental shaft adapted to engage the gears fixed upon the spindle, an internal gear upon the supplemental shaft, gears and a pinion actuated by the idler shaft the pinion engaging the internal gear and the gears being adapted to engage the gears splined upon the spindle, slide bars, forks on the slide bars engaging the splined gears, and levers for selectively actuating the slide bars.

3. In a change gear mechanism the combination of a drive shaft, gears fixedly mounted on the drive shaft, gears splined on the drive shaft, an idler shaft, gears fixed on the idler shaft adapted to engage the gears splined on the drive shaft, gears splined on the idler shaft adapted to engage the fixed gears on the drive shaft, a spindle extending in substantial parallelism with the drive and idler shafts, gears fixed on the spindle, gears splined on the spindle, a supplementary shaft, gears splined on the supplemental shaft adapted to engage the gears fixed upon the spindle, an internal gear upon the supplemental shaft, gears and a pinion actuated by the idler shaft, the pinion engaging the internal gear, and the gears being adapted to engage the gears splined upon the spindle, slide bars, forks on the slide bars engaging the splined gears, levers for selectively actuating the slide bars, means to actuate the drive shaft, and means to control the transmission of power from the first mentioned means to the drive shaft.

4. In a change gear mechanism the combination of a drive shaft, an idler shaft, a follow shaft, a supplemental shaft, and a spindle all extending in substantial parallelism, gears fixedly mounted on the drive shaft, the idler shaft, the follow shaft and the spindle, gears splined upon the drive shaft, the idler shaft, the supplemental shaft and the spindle, pinions on the idler shaft and on the follow shaft, the pinion on the idler shaft engaging a gear fixed on the follow shaft, an internal gear on the supplemental shaft engaging the pinion on the follow shaft, the splined gears on the drive shaft and on the idler shaft being adapted to engage the fixed gears on the idler shaft and drive shaft respectively, the splined gears on the spindle being adapted to engage the fixed gears on the follow shaft, the splined gears on the supplemental shaft being adapted to engage the fixed gears on the spindle, a lever to selectively actuate the splined gears on the drive shaft and on the idler shaft, and a lever to selectively actuate the splined gears on the spindle and on the supplemental shaft.

5. In a change gear mechanism the combination of a drive shaft, an idler shaft, a follow shaft, a supplemental shaft, and a spindle all extending in substantial parallelism, gears fixedly mounted on the drive shaft, the idler shaft, the follow shaft and the spindle, gears splined upon the follow shaft, the idler shaft, the supplemental shaft and the spindle, pinions on the idler shaft and on the follow shaft, the pinion on the idler shaft engaging a gear fixed on the follow shaft, an internal gear on the supplemental shaft engaging the pinion on the follow shaft, the splined gears on the drive shaft and on the idler shaft being adapted to engage the fixed gears on the idler shaft and drive shaft respectively, the splined gears on the spindle being adapted to engage the fixed gears on the follow shaft, the splined gears on the supplemental shaft being adapted to engage the fixed gears on the spindle, slide bars, forks on the slide bars engaging the splined gears, a lever for selectively actuating the slide bars carrying the forks engaging the gears splined on the drive shaft and idler shaft, and a lever for selectively actuating the slide bars carrying the forks engaging the gears splined on the spindle and on the auxiliary shaft.

6. In a change gear mechanism the combination of a drive shaft, an idler shaft, a follow shaft, a supplemental shaft, and a spindle all extending in substantial parallelism, gears fixedly mounted on the drive shaft, the idler shaft, the follow shaft and the spindle, gears splined upon the follow shaft, the idler shaft, the supplemental shaft and the spindle, pinions on the idler shaft and on the follow shaft, the pinion on the idler shaft engaging a gear fixed on the follow shaft, an internal gear on the supplemental shaft engaging the pinion on the follow shaft, the splined gears on the drive shaft and on the idler shaft being adapted to engage the fixed gears on the idler shaft and drive shaft respectively, the splined gears on the spindle being adapted to engage the fixed gears on the follow shaft, the splined gears on the supplemental shaft being adapted to engage the fixed gears on the spindle, slide bars each having a slot, forks mounted on the slide bars engaging the splined gears, the slide bars and forks carried thereby being capable of reciprocation in parallelism with the shafts, a bar extending transversely to the line of reciprocation of the slide bars, capable of rotatory motion and adapted to be reciprocated longitudinally of itself, a pin carried by the shaft adapted to enter the slots in the slide bars, and adapted in its normal position to extend partly into the slots formed in the slide bars carrying the forks engaging the gears splined on the drive and idler shafts and of a size such that when the shaft is reciprocated longitudinally of itself from its normal position, to lie within one of the slots and without the other, and a second shaft and pin bearing the same relation to the slide bars carrying the forks engaging the gears splined on the spindle and on the supplemental shaft.

7. In a change gear mechanism the combination of a drive shaft, an idler shaft, a follow shaft, a supplemental shaft, and a spindle all extending in substantial parallelism, gears fixedly mounted on the drive shaft, the idler shaft, the follow shaft and the spindle, gears splined upon the follow shaft, the idler shaft, the supplemental shaft and the spindle, pinions on the idler shaft and on the follow shaft, the pinions on the idler shaft engaging a gear fixed on the follow shaft, an internal gear on the supplemental shaft engaging the pinion on the follow shaft, the splined gears on the drive shaft and on the idler shaft being adapted to engage the fixed gears on the idler shaft and drive shaft respectively, the splined gears on the spindle being adapted to engage the fixed gears on the follow shafts, the splined gears on the supplemental shaft being adapted to engage the fixed gears on the spindle, slide bars each having a slot, forks mounted on the slide bars engaging the spindle gears, the slide bars and forks carried thereby being capable of reciprocation in parallelism with the shafts, a tube shaft capable of rotary motion and adapted to be reciprocated longitudinally of itself, a shaft within the tube shaft capable of rotary motion and adapted to be reciprocated longitudinally of itself, pins carried by the tube shaft and the shaft within the tube shaft, the pin on the tube shaft being adapted normally to lie partly within the slots in the slide bars carrying the forks engaging the splined gears on the spindle and on the auxiliary shaft, the pin carried by the shaft within the tube shaft being adapted normally to lie partly within the slots in the slide bars carrying the forks engaging the gears splined on the drive shaft and on the idler shaft, both pins bearing a relation to the slide bars and to the slots into which they normally extend, such that by reciprocating the tube shaft and the shaft therein, the pins may be moved without one of the bars and be moved further into the slot in the other of the bars, whereby rotary motion imparted to the tube shaft and the shaft within the tube shaft will serve to actuate one each of the slide bars, and means to preclude rotatory motion of the tube shaft and the shaft contained therein when the pins are in their normal positions.

8. In a change gear mechanism the combination of a plurality of rotatably mounted shafts having relatively different speeds of rotation, gears slidably and fixedly mounted on each shaft, the slidable gears on one shaft selectively engaging the fixed gears on another shaft for changing the relative speeds of adjacent shafts, a plurality of shift bars associated with the shafts and connected with the slidable gears for selectively shifting the slidable gears on the shafts for selectively changing the relative speeds of the shafts, and a telescoping shaft comprising an inner and an outer member concentrically, rotatably and slidably mounted at an angle to the shift bars and carrying members for selective operable connection with the said shift bars for selectively shifting the slidable gears for selectively varying the relative speeds of adjacent shafts.

9. In a change gear mechanism the combination with a plurality of rotatably mounted shafts and transmitting means for transmitting variable speeds from one shaft to the other, some of the transmitting means being slidable for varying the relative speeds of successive shafts, of means shiftable longitudinally of the shafts for selectively shifting the slidable transmitting means carried by the shafts, and a telescoping shaft comprising a pair of shafts concentrically, rotatably and slidably mounted at an angle to the longitudinal shiftable means and having projecting members engageable with said longitudinal shiftable means for selectively actuating the slidable transmitting means for selectively changing the relative speeds of successive shafts.

10. In a change gear mechanism comprising a plurality of rotatable shafts and means for transmitting different speeds of rotation from one shaft to the other, the combination of means shiftable longitudinally of the shafts for shifting the transmitting means for changing the relative speeds of successive shafts, and means comprising a plurality of members concentrically mounted and extending at an angle to said shiftable means and provided with means for individual selective engagement with one of the said longitudinal shiftable means for selectively changing the relative speeds of successive shafts.

In testimony whereof, I have hereunto subscribed my name this 4th day of January, 1922.

WILLIAM F. GROENE.